(12) United States Patent
Nishio et al.

(10) Patent No.: US 8,243,384 B2
(45) Date of Patent: Aug. 14, 2012

(54) MOTOR AND DISK DRIVE APPARATUS

(75) Inventors: Mitsuhito Nishio, Kyoto (JP); Takuya Yamane, Kyoto (JP); Hisakazu Motomochi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/223,677

(22) Filed: Sep. 1, 2011

(65) Prior Publication Data

US 2012/0063029 A1    Mar. 15, 2012

(30) Foreign Application Priority Data

Sep. 9, 2010  (JP) .................................. 2010-201713

(51) Int. Cl.
*G11B 17/02*        (2006.01)
(52) U.S. Cl. .................................................. 360/99.08
(58) Field of Classification Search .............. 360/99.08, 360/97.01, 98.07, 99.05, 99.22, 97.02
See application file for complete search history.

(56) References Cited

U.S. PATENT DOCUMENTS

| | | | | |
|---|---|---|---|---|
| 3,786,288 A | * | 1/1974 | Joannou | 310/68 R |
| 2002/0113503 A1 | * | 8/2002 | Nagatsuka | 310/67 R |
| 2008/0095022 A1 | * | 4/2008 | Hanai et al. | 369/263.1 |
| 2008/0238230 A1 | * | 10/2008 | Mochida et al. | 310/90.5 |
| 2010/0148608 A1 | * | 6/2010 | Kim et al. | 310/90 |
| 2011/0035763 A1 | * | 2/2011 | Nakanishi et al. | 720/695 |

FOREIGN PATENT DOCUMENTS

| | | |
|---|---|---|
| JP | 09-198761 A | 7/1997 |
| JP | 2002-100091 A | 4/2002 |
| KR | 10-0802507 B1 | 2/2008 |

* cited by examiner

*Primary Examiner* — Allen Cao
(74) *Attorney, Agent, or Firm* — Westerman, Hattori, Daniels & Adrian, LLP

(57) ABSTRACT

Inner circumferential surfaces of a rotor holder and a turntable are in contact with an outer circumferential surface of a shaft. This stabilizes coaxiality of both the rotor holder and the turntable with respect to the shaft. An upper cover portion of the rotor holder includes fixing holes. The turntable includes fixing projections arranged to extend through the fixing holes to be in contact with a lower surface of the upper cover portion. A base end portion of each fixing projection is arranged at a level higher than that of an upper end portion of a corresponding one of the fixing holes. Therefore, even if dimensional errors of the rotor holder and the turntable cause a radial displacement between any fixing projection and a corresponding one of the fixing holes, the rotor holder and the turntable can be fixed to each other while maintaining coaxiality therebetween.

17 Claims, 15 Drawing Sheets

MOTOR AND DISK DRIVE APPARATUS

BACKGROUND OF THE INVENTION

1. Field of the Invention

The present invention relates to a motor and a disk drive apparatus.

2. Description of the Related Art

A brushless motor is typically installed in a disk drive apparatus, such as an optical disk drive, to rotate a disk. In recent years, there has been a tendency toward higher rotational speeds of brushless motors in accordance with increasing speeds of disk drive apparatuses. Brushless motors having high rotational speeds experience a great change in rotation rate when drive thereof is started and when the drive thereof is ended.

While the brushless motor is rotated, action of magnetic flux between an armature and a magnet causes vibrations referred to as a cogging. An excitation frequency, which represents the number of vibrations of the cogging per unit time, depends on the rotation rate of the brushless motor. Therefore, a great change in the rotation rate of the brushless motor involves a great change in the excitation frequency. When the excitation frequency coincides with a natural frequency of a vibrator, resonance occurs, so that the vibration may become particularly great.

One conceivable method for avoiding the resonance as described above is to improve the rigidity of the vibrator and thereby increase the natural frequency of the vibrator. For example, it is conceivable to secure a rotor holder and a turntable, i.e., the vibrator, to each other to unite them together. In this case, a vibrator defined by the turntable and the rotor holder has an increased natural frequency. When the natural frequency of the vibrator is arranged to be higher than an excitation frequency during high-speed rotation thereof, occurrence of the resonance is prevented.

For example, it is conceivable to secure the turntable to the rotor holder by inserting projections defined on a lower surface of the turntable into holes defined in a rotor yoke.

This arrangement, however, has a problem in that the rotor yoke is fixed to the turntable while the turntable is fixed with respect to a rotation axis. That is, the rotor yoke is fixed to a shaft through the turntable. Therefore, the degree of coaxiality of the rotor yoke with respect to the rotation axis depends on the degree of precision with which the turntable is shaped. Therefore, when there are variations in the precision with which turntables are shaped, the degrees of coaxiality of rotor holders with respect to the rotation axis will vary. A poor degree of coaxiality of the rotor holder with respect to the rotation axis may promote the occurrence of vibrations of a rotating body including the turntable and the rotor yoke.

SUMMARY OF THE INVENTION

A motor according to a first preferred embodiment of the present invention includes a stationary portion, and a rotating portion supported to be rotatable with respect to the stationary portion. The rotating portion includes a shaft, a rotor holder, a rotor magnet, and a turntable. The shaft is arranged to extend along a central axis extending in a vertical direction. The rotor holder includes an upper cover portion arranged to spread radially away from the central axis, and a cylindrical portion arranged to extend downward from a radially outer end portion of the upper cover portion. The rotor magnet is fixed to an inner circumferential surface of the cylindrical portion of the rotor holder. The turntable is arranged above the rotor holder to support a disk directly or indirectly. The stationary portion includes a bearing portion and an armature. The bearing portion is arranged to rotatably support the shaft. The armature is arranged radially opposite the rotor magnet. The rotor holder includes a first through hole defined in a center thereof, and an inner circumferential surface defining the first through hole and arranged to be in contact with an outer circumferential surface of the shaft. The turntable includes a second through hole defined in a center thereof, and an inner circumferential surface defining the second through hole and arranged to be in contact with the outer circumferential surface of the shaft. The upper cover portion includes a plurality of fixing holes arranged to extend in the vertical direction therethrough. The turntable includes a plurality of fixing projections arranged to extend through the fixing holes beyond a lower surface of the upper cover portion to be in contact with the lower surface of the upper cover portion. Each of the fixing projections includes a base end portion arranged at a level higher than that of an upper end portion of a corresponding one of the fixing holes. The fixing projection is arranged to be elastically deformable in a radial direction above the upper end portion of the corresponding fixing hole.

A motor according to a second preferred embodiment of the present invention includes a stationary portion, and a rotating portion supported to be rotatable with respect to the stationary portion. The rotating portion includes a shaft, a rotor holder, a rotor magnet, and a turntable. The shaft is arranged to extend along a central axis extending in a vertical direction. The rotor holder includes an upper cover portion arranged to spread radially away from the central axis, and a cylindrical portion arranged to extend downward from a radially outer end portion of the upper cover portion. The rotor magnet is fixed to an inner circumferential surface of the cylindrical portion of the rotor holder. The turntable is arranged above the rotor holder to support a disk directly or indirectly. The stationary portion includes a bearing portion and an armature. The bearing portion is arranged to rotatably support the shaft. The armature is arranged radially opposite the rotor magnet. The rotor holder includes a first through hole defined in a center thereof, and an inner circumferential surface defining the first through hole and arranged to be in contact with an outer circumferential surface of the shaft. The turntable includes a second through hole defined in a center thereof, and an inner circumferential surface defining the second through hole and arranged to be in contact with the outer circumferential surface of the shaft. The upper cover portion includes a plurality of fixing holes arranged to extend in the vertical direction therethrough. The turntable includes a plurality of fixing projections arranged to extend through the fixing holes beyond a lower surface of the upper cover portion to be in contact with the lower surface of the upper cover portion. Radially inner and outer surfaces of each fixing projection are arranged radially opposite a surface of the rotor holder which defines a corresponding one of the fixing holes with intervening gaps.

According to preferred embodiments of the present invention, both the inner circumferential surface of the rotor holder and the inner circumferential surface of the turntable are arranged to be in contact with the outer circumferential surface of the shaft. This stabilizes coaxiality of both the rotor holder and the turntable with respect to the shaft. Moreover, even if dimensional errors of the rotor holder and the turntable cause a radial displacement between any fixing projection and a corresponding one of the fixing holes, the rotor holder and the turntable can be fixed to each other while maintaining coaxiality therebetween.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that a side on which a disk is arranged and a side on which a turntable is arranged in relation to each other are defined as an upper side and a lower side, respectively. The shape of each member or portion and relative positions of different members or portions will be described based on this assumption. It should be noted, however, that the above definitions of the vertical direction and the upper and lower sides are simply applied to facilitate the description provided herein, and should not be construed to restrict in any way the orientation of a motor or a disk drive apparatus according to any embodiment of the present invention when in actual use.

1. Motor According to Preferred Embodiment

Figure 1:
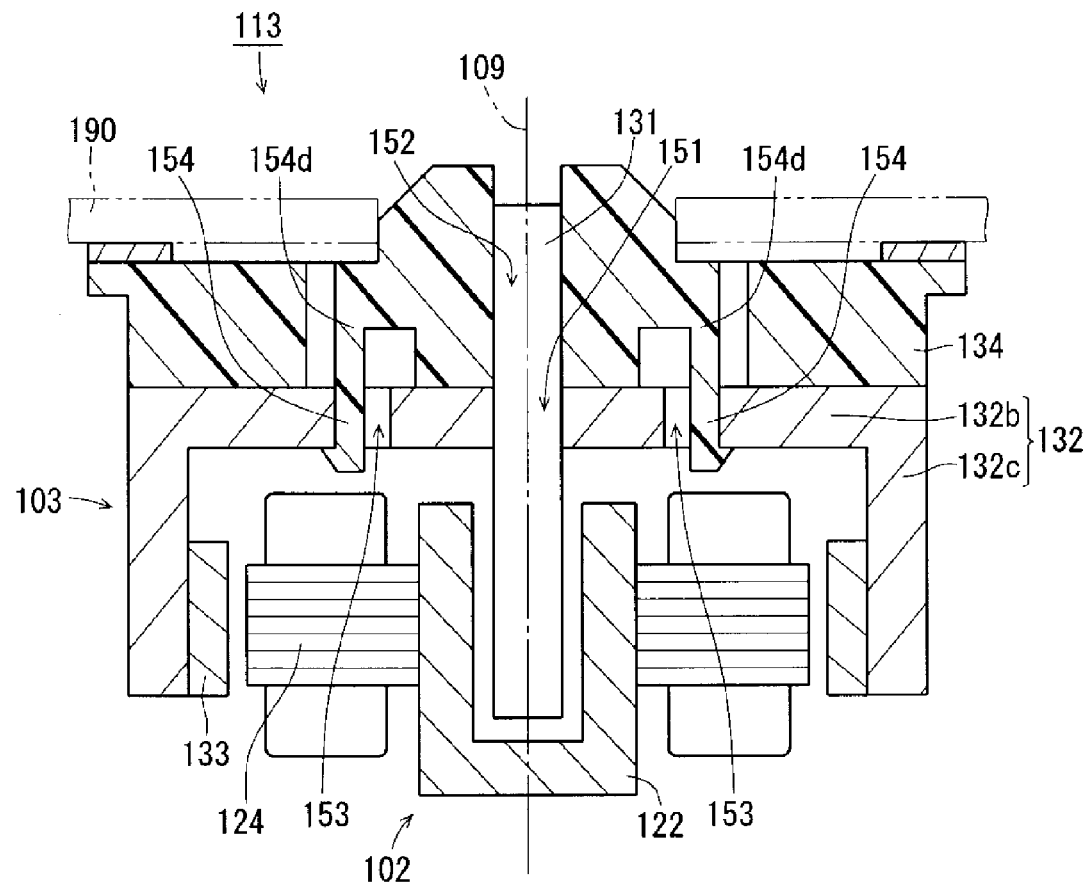
FIG. 1 is a vertical cross-sectional view of a motor according to a preferred embodiment of the present invention.

FIG. 1 is a vertical cross-sectional view of a motor 113 according to a preferred embodiment of the present invention.

As illustrated in FIG. 1, the motor 113 includes a stationary portion 102 and a rotating portion 103. The rotating portion 103 is supported to be rotatable with respect to the stationary portion 102.

The stationary portion 102 includes a bearing portion 122 and an armature 124. The bearing portion 122 is arranged to rotatably support a shaft 131, which will be described below. The armature 124 is arranged radially opposite a rotor magnet 133, which will be described below. Note here that directions perpendicular to a central axis 109 are herein referred to by the term "radial direction", "radial", or "radially".

The rotating portion 103 includes the shaft 131, a rotor holder 132, the rotor magnet 133, and a turntable 134.

The shaft 131 is arranged to extend along the central axis 109 extending in the vertical direction. The rotor holder 132 includes an upper cover portion 132b and a cylindrical portion 132c. The upper cover portion 132b is arranged to spread radially away from the central axis 109. The cylindrical portion 132c is arranged to extend downward from a radially outer end portion of the upper cover portion 132b. The rotor holder 132 includes a first through hole 151 defined in a center thereof. An inner circumferential surface of the rotor holder 132 which defines the first through hole 151 is arranged to be in contact with an outer circumferential surface of the shaft 131. In addition, the upper cover portion 132b of the rotor holder 132 includes a plurality of fixing holes 153 arranged to extend in the vertical direction therethrough.

The rotor magnet 133 is fixed to an inner circumferential surface of the cylindrical portion 132c of the rotor holder 132. The turntable 134 is arranged above the rotor holder 132. The turntable 134 is arranged to support a disk 190 directly or indirectly. In addition, the turntable 134 includes a second through hole 152 defined in a center thereof. An inner circumferential surface of the turntable 134 which defines the second through hole 152 is arranged to be in contact with the outer circumferential surface of the shaft 131.

As described above, both the inner circumferential surface of the rotor holder 132 and the inner circumferential surface of the turntable 134 are arranged to be in contact with the outer circumferential surface of the shaft 131. This contributes to stably maintaining coaxiality of each of the rotor holder 132 and the turntable 134 with respect to the shaft 131.

Moreover, the turntable 134 includes a plurality of fixing projections 154. Each fixing projection 154 is arranged to extend through a corresponding one of the fixing holes 153 of the rotor holder 132 beyond a lower surface of the upper cover portion 132b to be in contact with the lower surface of the upper cover portion 132b. A base end portion 154d of the fixing projection 154 is arranged at a level higher than that of an upper end portion of the corresponding fixing hole 153. The fixing projection 154 is elastically deformable in a radial direction above the upper end portion of the corresponding fixing hole 153.

Even if dimensional errors of the rotor holder 132 and the turntable 134 cause a radial displacement between any fixing projection 154 and a corresponding one of the fixing holes 153, the fixing projection 154 is capable of being elastically deformed in the radial direction above the upper end portion of the corresponding fixing hole 153. This enables the rotor holder 132 and the turntable 134 to be fixed to each other while maintaining coaxiality therebetween.

Figure 2:
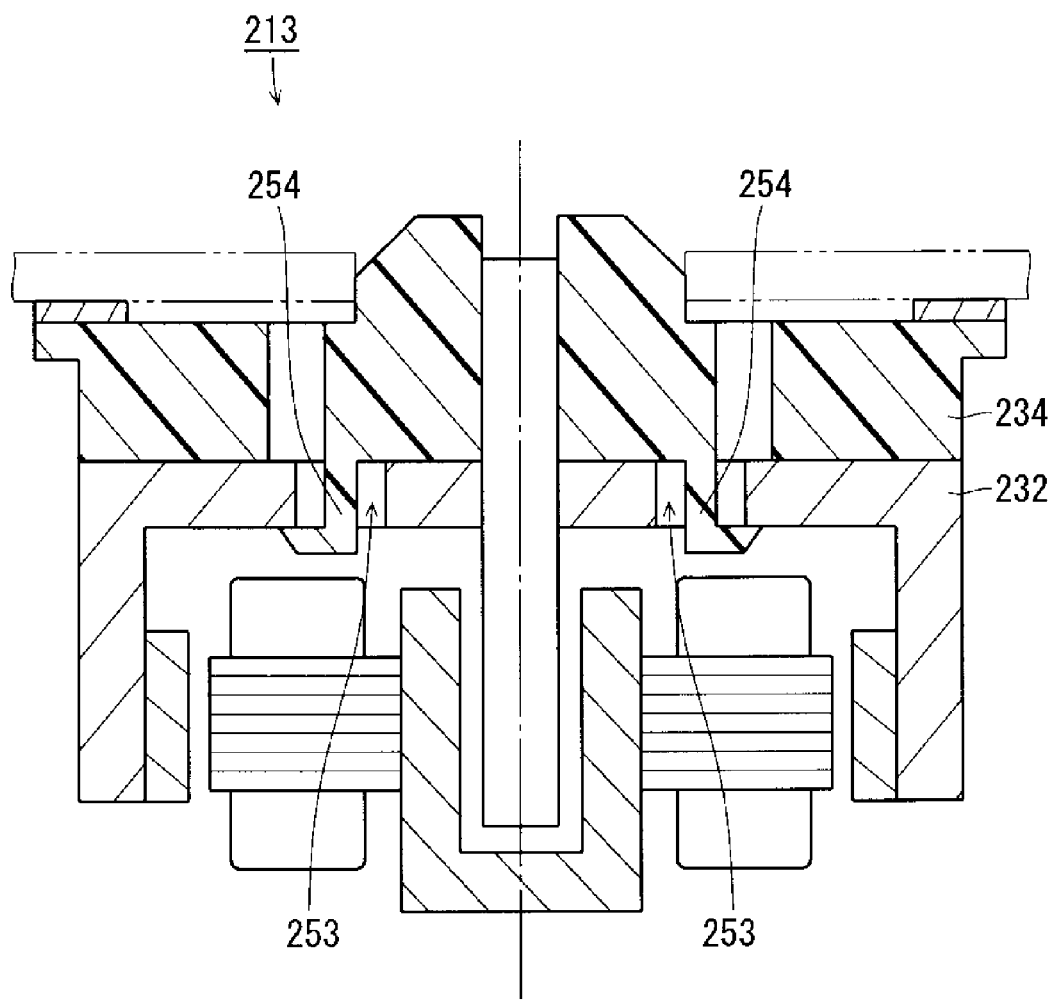
FIG. 2 is a vertical cross-sectional view of a motor according to a preferred embodiment of the present invention.

FIG. 2 illustrates a fixing structure for fixing a rotor holder 232 and a turntable 234 to each other according to another preferred embodiment of the present invention. In a motor 213 illustrated in FIG. 2, a radially inner surface and a radially outer surface of each of fixing projections 254 are arranged radially opposite a surface defining a corresponding one of fixing holes 253 of the rotor holder 232 with intervening gaps. Therefore, even if dimensional errors of the rotor holder 232 and the turntable 234 cause a radial displacement between any fixing projection 254 and a corresponding one of the fixing holes 253, it is possible to insert the fixing projection 254 into the corresponding fixing hole 253 without a need to deform the fixing projection 254. This enables the rotor holder 232 and the turntable 234 to be fixed to each other while maintaining coaxiality therebetween.

2. Specific Structures of Preferred Embodiments 2-1. Structure of Disk Drive Apparatus Next, a more specific preferred embodiment of the present invention will now be described below.

Figure 3:
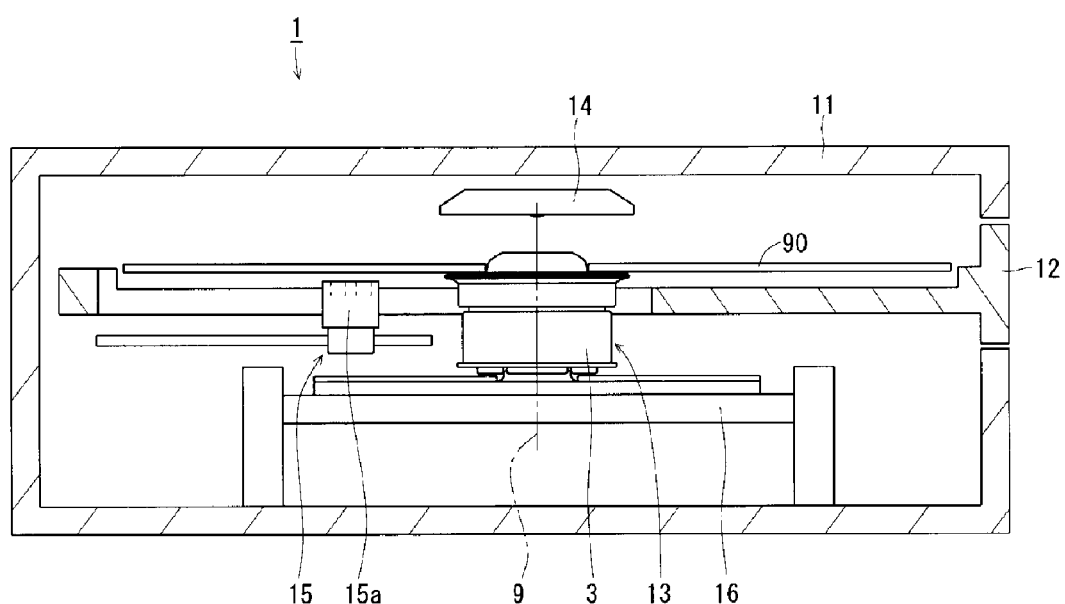
FIG. 3 is a vertical cross-sectional view of a disk drive apparatus according to a preferred embodiment of the present invention.

FIG. 3 is a vertical cross-sectional view of a disk drive apparatus 1 according to a preferred embodiment of the present invention. The disk drive apparatus 1 is a device designed to perform at least one of reading and writing of information from or to an optical disk 90 (hereinafter referred to simply as a "disk 90") while rotating the disk 90. The disk drive apparatus 1 includes an apparatus housing 11, a disk tray 12, a brushless motor 13, a clamper 14, and an access portion 15.

The apparatus housing 11 is a case. The apparatus housing 11 is arranged to contain the disk tray 12, the brushless motor 13, the clamper 14, and the access portion 15. The disk tray 12 is a mechanism arranged to convey the disk 90 between an interior and an exterior of the apparatus housing 11. The brushless motor 13 is fixed to a chassis 16 arranged inside the apparatus housing 11. Once the disk 90 is conveyed to the brushless motor 13 through the disk tray 12, the disk 90 is held between the clamper 14 and a rotating portion 3 of the brushless motor 13. The disk 90 is then caused by the brushless motor 13 to rotate about a central axis 9.

The access portion 15 includes a head 15a having an optical pickup function. The access portion 15 is arranged to move the head 15a along a recording surface of the disk 90 held by the brushless motor 13 to perform at least one of reading and writing of information from or to the disk 90.

2-2. Structure of Brushless Motor

Next, the structure of the brushless motor 13 described above will now be described below.

Figure 4:
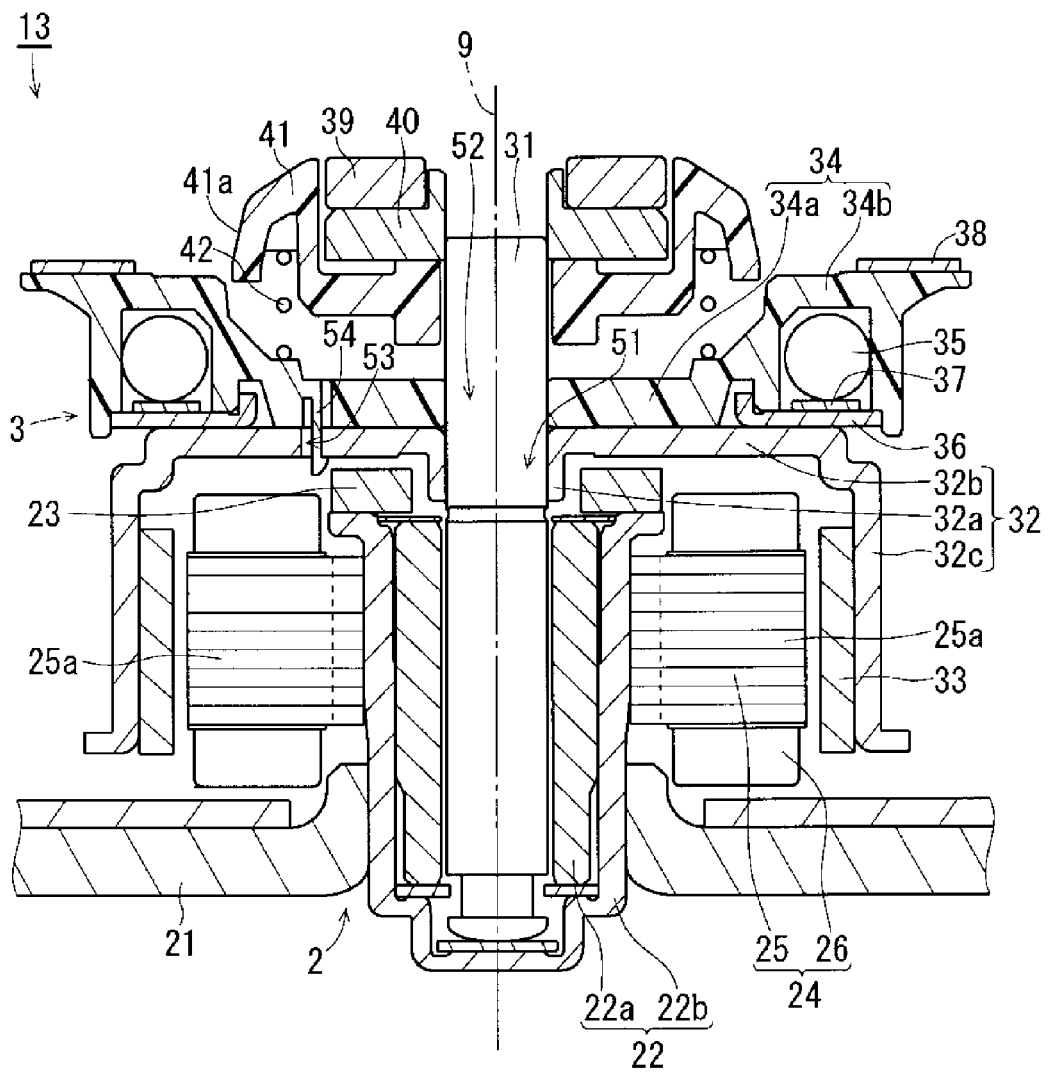
FIG. 4 is a vertical cross-sectional view of a brushless motor according to a preferred embodiment of the present invention.

FIG. 4 is a vertical cross-sectional view of the brushless motor 13. As illustrated in FIG. 4, the brushless motor 13 includes a stationary portion 2 and the rotating portion 3. The stationary portion 2 is fixed to the chassis 16 (see FIG. 3) of the disk drive apparatus 1. The rotating portion 3 is supported to be rotatable with respect to the stationary portion 2.

The stationary portion 2 includes a base member 21, a stationary bearing unit 22, a preload magnet 23, and an armature unit 24.

The stationary bearing unit 22 is a mechanism arranged to support a shaft 31 while permitting rotation of the shaft 31. The stationary bearing unit 22 includes a sleeve 22a and a sleeve housing 22b. The sleeve 22a is substantially cylindrical. The sleeve 22a is arranged to surround an outer circumferential surface of the shaft 31. The sleeve housing 22b is substantially in the shape of a cup. The sleeve housing 22b is arranged to hold the sleeve 22a therewithin. The sleeve housing 22b is fixed to the base member 21.

The preload magnet 23 is fixed to an upper end portion of the sleeve housing 22b. The preload magnet 23 is arranged to generate a magnetic attraction force acting in an axial direction between a rotor holder 32, which will be described below, and the preload magnet 23. Note here that a direction parallel to the central axis will be herein referred to by the term "axial direction", "axial", or "axially". The rotating portion 3 is thereby attracted toward the stationary portion 2, so that the orientation of the rotating portion 3 is stabilized during rotation.

The armature unit 24 includes a stator core 25 and coils 26. The stator core 25 includes a plurality of tooth portions 25a. Each of the coils 26 is wound on a separate one of the tooth portions 25a. The stator core 25 is fixed to an outer circumferential surface of the sleeve housing 22b. The stator core 25 and the coils 26 are arranged radially inside a rotor magnet 33, which will be described below.

Once a drive current is supplied to the coils 26, magnetic flux is generated around the tooth portions 25a of the stator core 25. Then, the magnetic flux generated around the tooth portions 25a and magnetic flux generated from the rotor magnet 33, which will be described below, interact with each other to generate a circumferential torque. As a result, the rotating portion 3 is caused to rotate about the central axis 9. The disk 90 held by the rotating portion 3 is caused to rotate about the central axis 9 together with the rotating portion 3.

The rotating portion 3 includes the shaft 31, the rotor holder 32, the rotor magnet 33, a turntable 34, a plurality of balls 35, a closing plate 36, a slip-preventing member 37, a disk mount member 38, a clamp magnet 39, a yoke 40, a cone 41, and a preload spring 42.

The shaft 31 is substantially in the shape of a column, and arranged to extend along the central axis 9 in the vertical direction. A lower portion of the shaft 31 is inserted inside the sleeve 22a. The shaft 31 is supported by the stationary bearing unit 22 such that the shaft 31 is rotatable about the central axis 9.

The rotor holder 32 is fixed to the shaft 31 and arranged to rotate together with the shaft 31. The rotor holder 32 is, for example, obtained by subjecting a magnetic plate, such as a galvanized steel sheet, to press forming. Note, however, that the rotor holder 32 may be obtained by another method of construction, such as a cutting process.

The rotor holder 32 includes a joining portion 32a, an upper cover portion 32b, and a cylindrical portion 32c. The joining portion 32a is substantially cylindrical. The joining portion 32a is press fitted and thereby fixed to the shaft 31. The upper cover portion 32b is arranged to spread radially from an upper end portion of the joining portion 32a to an upper end portion of the cylindrical portion 32c. The cylindrical portion 32c is substantially cylindrical. The cylindrical portion 32c is arranged to extend downward from a radially outer end portion of the upper cover portion 32b. The cylindrical portion 32c is arranged to be coaxial with the central axis 9.

The rotor holder 32 includes a first through hole 51 defined in a center thereof. The shaft 31 is inserted into the first through hole 51 with application of a pressure. The first through hole 51 is defined by an inner circumferential surface of the joining portion 32a of the rotor holder 32. The rotor holder 32 is fixed to the shaft 31 with the inner circumferential surface of the joining portion 32a arranged to be in contact with the outer circumferential surface of the shaft 31.

The rotor magnet 33 is an annular permanent magnet. The rotor magnet 33 is fixed to an inner circumferential surface of the cylindrical portion 32c of the rotor holder 32. An inner circumferential surface of the rotor magnet 33 defines a magnetic pole surface arranged radially opposite end surfaces of the tooth portions 25a of the stator core 25.

The turntable 34 is arranged to rotate together with the rotor holder 32. The turntable 34 is, for example, obtained by an injection molding process using a resin such as polycarbonate. The turntable 34 is fixed to the upper cover portion 32b of the rotor holder 32. A fixing structure for fixing the rotor holder 32 and the turntable 34 to each other will be described below.

The turntable 34 includes a plate portion 34a and a ball holding portion 34b. The plate portion 34a is substantially in the shape of a disc, and arranged below the cone 41. The ball holding portion 34b is arranged radially outward of the plate portion 34a to hold the balls 35. The ball holding portion 34b includes a circular groove with a downward opening centered on the central axis 9.

The closing plate 36, which is substantially annular in shape, is attached to a lower portion of the ball holding portion 34b to close the ball holding portion 34b from below. The balls 35 are arranged in a circular space enclosed by the ball holding portion 34b and the closing plate 36, such that the balls 35 are capable of rolling in a circumferential direction. The balls 35 are disposed on the slip-preventing member 37, which is attached to an upper surface of the closing plate 36.

The balls 35 serve to correct a displacement of the center of gravity of a combination of the rotating portion 3 and the disk 90 with respect to the central axis 9. Once the rotating portion 3 and the disk 90 start rotating and then the rotation rate thereof exceeds a certain level, the balls 35 roll in directions opposite to the center of gravity with respect to the central axis 9. This contributes to adjusting the center of gravity of the combination of the rotating portion 3 and the disk 90 so that the center of gravity becomes closer to the central axis 9.

The disk mount member 38, which is annular in shape, is fixed to an upper surface of the turntable 34. An upper surface of the disk mount member 38 serves as a mounting surface on which the disk 90 is mounted. That is, in the present preferred embodiment, the turntable 34 is arranged to indirectly support a lower surface of the disk 90 through the disk mount member 38. Note that the turntable 34 may be arranged to directly support the lower surface of the disk 90 without intermediacy of the disk mount member 38.

In addition, the turntable 34 includes a second through hole 52 defined in a center thereof. The shaft 31 is inserted into the second through hole 52. The second through hole 52 is defined by an inner circumferential surface of the plate portion 34a of the turntable 34. The turntable 34 is fixed to the shaft 31 with the inner circumferential surface of the plate portion 34a arranged to be in contact with the outer circumferential surface of the shaft 31.

As described above, in the brushless motor 13 according to the present preferred embodiment, both the inner circumferential surface of the joining portion 32a of the rotor holder 32 and the inner circumferential surface of the plate portion 34a of the turntable 34 are arranged to be in contact with the outer circumferential surface of the shaft 31. That is, each of the rotor holder 32 and the turntable 34 is directly positioned with respect to the shaft 31 without intermediacy of any other member. Each of the rotor holder 32 and the turntable 34 is thereby arranged to have a high degree of coaxiality with respect to the shaft 31.

The clamp magnet 39, the yoke 40, the cone 41, and the preload spring 42 are arranged above the plate portion 34a.

The clamp magnet 39 is a permanent magnet arranged to generate a magnetic attraction force acting between the clamp magnet 39 and the clamper 14 (see FIG. 3). The yoke 40 is a magnetic body arranged to improve directionality of a magnetic field generated from the clamp magnet 39. The yoke 40 is fixed to an upper end portion of the shaft 31. The clamp magnet 39 is fixed to an upper surface of the yoke 40. The disk 90 is held between the disk mount member 38 and the clamper 14 through the magnetic attraction force acting between the clamp magnet 39 and the clamper 14.

The cone 41 is a center adjustment member arranged to position a center of the disk 90 on the central axis 9 while supporting an inner circumferential portion of the disk 90. The cone 41 includes a support surface 41a arranged to support the inner circumferential portion of the disk 90. In addition, the cone 41 is arranged to be movable in an axial direction along the shaft 31.

The preload spring 42 is arranged between the cone 41 and the plate portion 34a of the turntable 34. An upper end portion of the preload spring 42 is arranged to be in contact with a lower surface of the cone 41. Moreover, a lower end portion of the preload spring 42 is arranged to be in contact with an upper surface of the plate portion 34a. The preload spring 42 is arranged to press the cone 41 in an upward direction. When the cone 41 does not hold the disk 90, the cone 41 is stationary while being in contact with a lower surface of the yoke 40. On the other hand, when the cone 41 holds the disk 90, the cone 41 shifts downward against a pressing force by the preload spring 42 while supporting the inner circumferential portion of the disk 90.

2-3. Fixing Structure I for Fixing Rotor Holder and Turntable to Each Other

Figure 5:
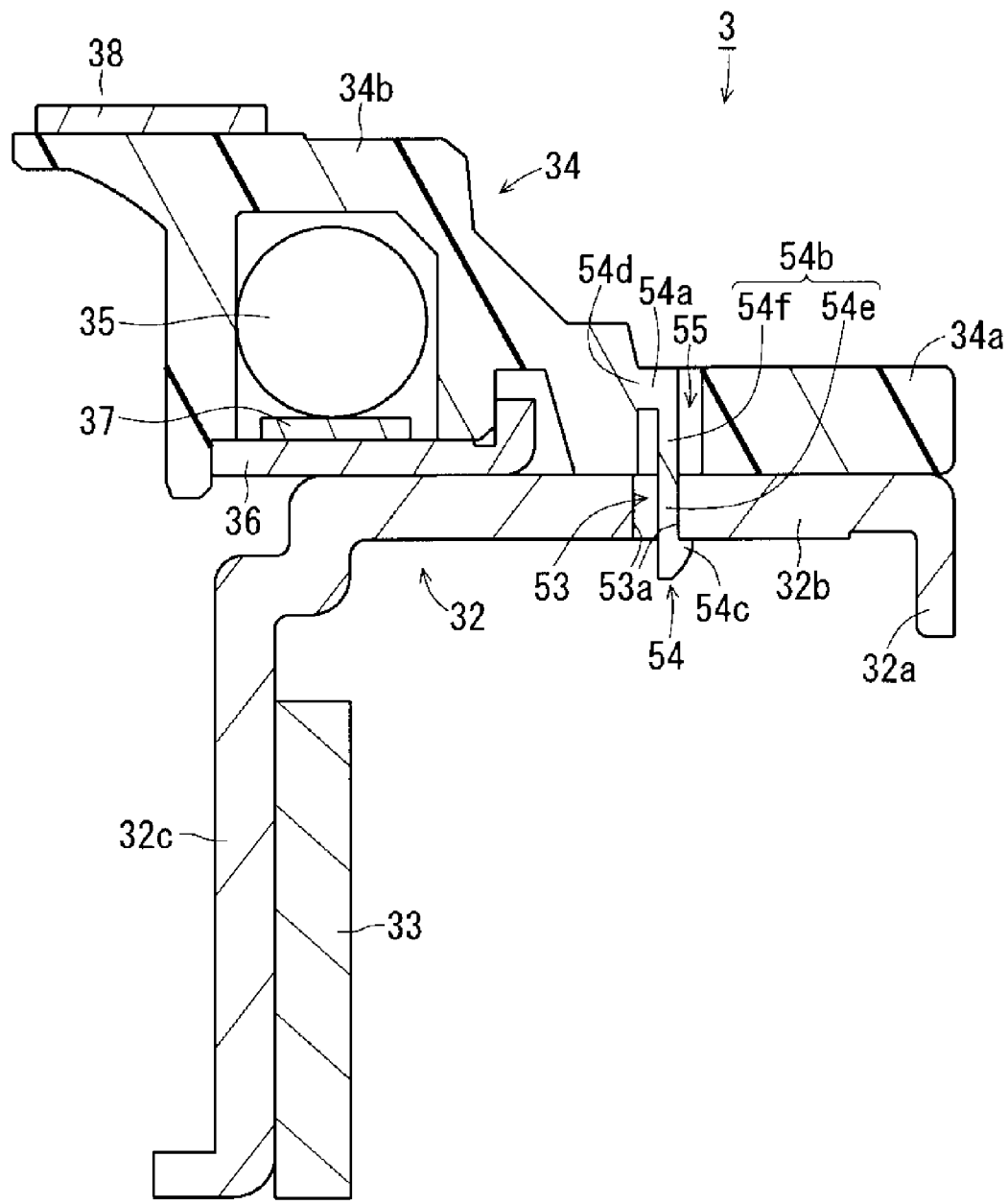
FIG. 5 is a partial vertical cross-sectional view of a rotating portion according to a preferred embodiment of the present invention.
Figure 6:
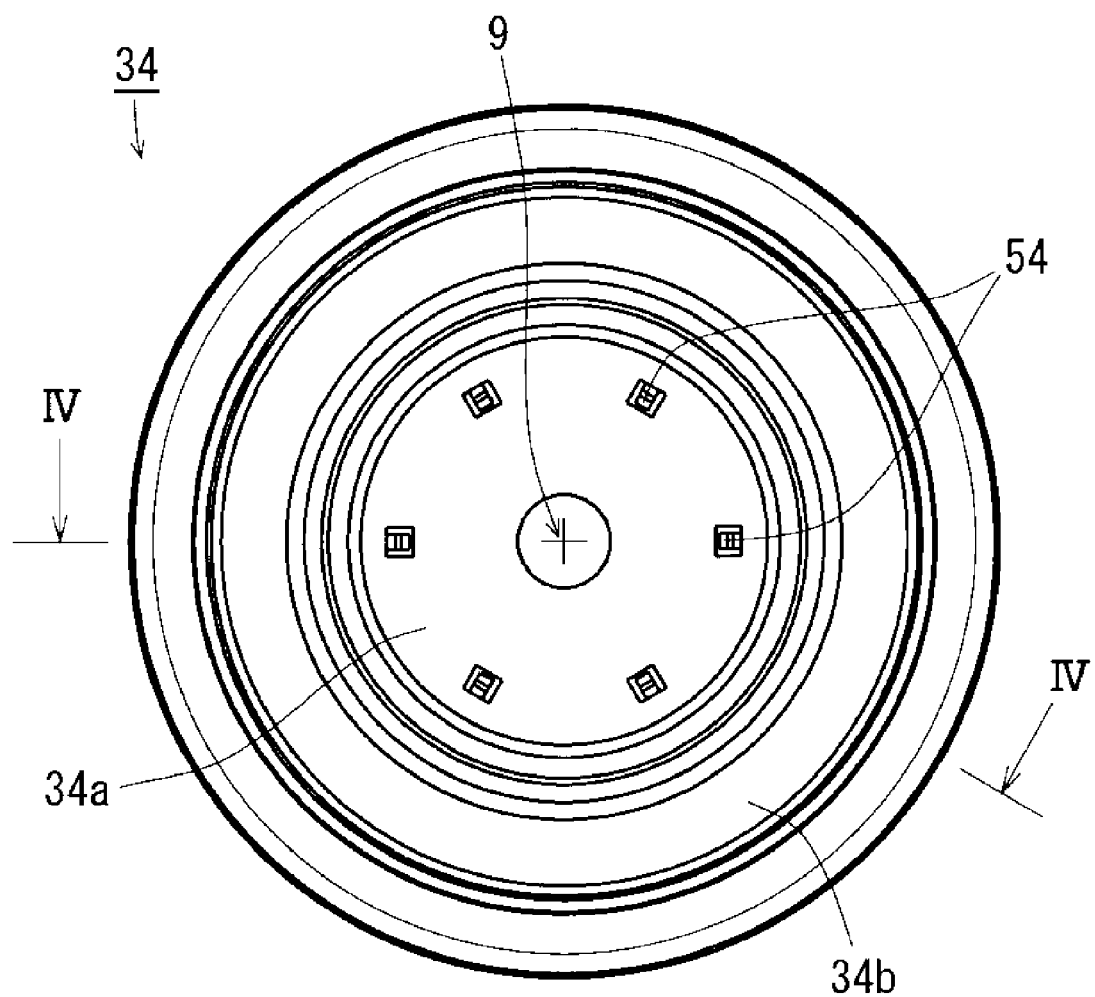
FIG. 6 is a bottom view of a turntable according to a preferred embodiment of the present invention.
Figure 7:
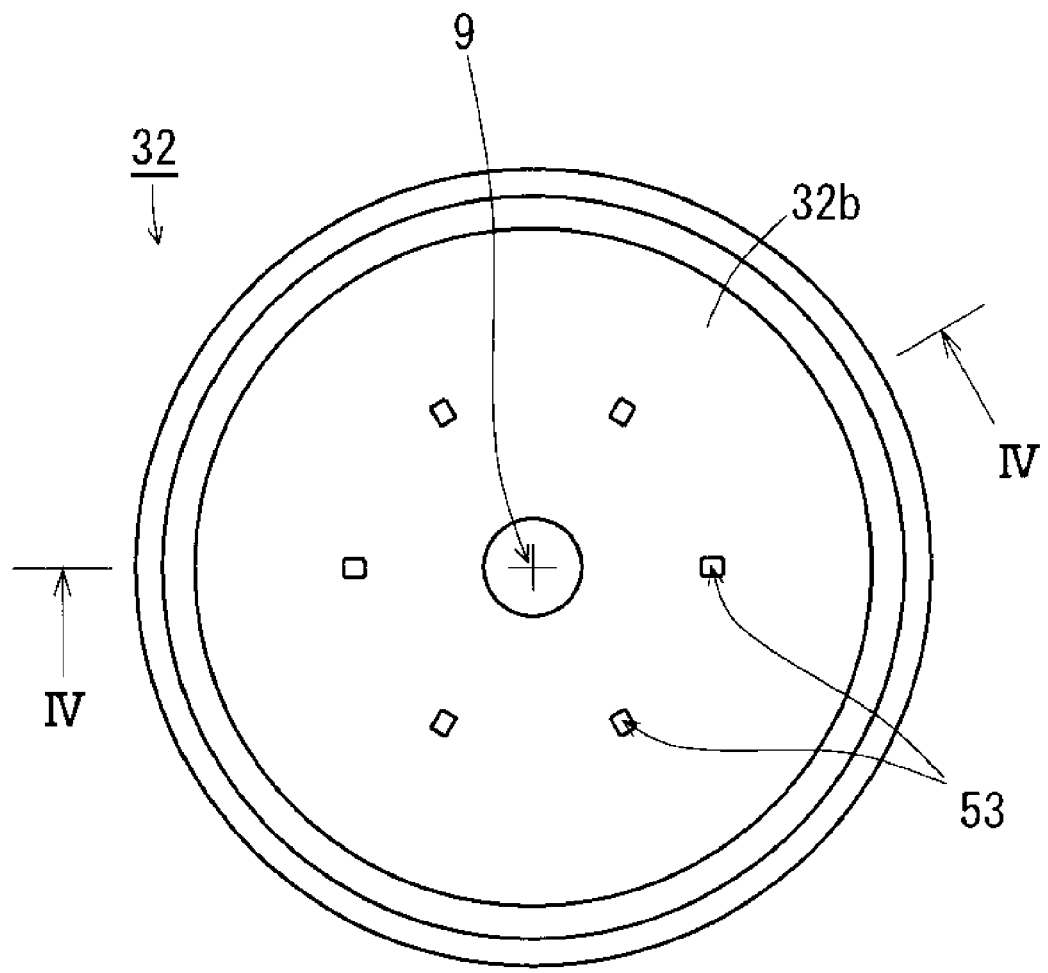
FIG. 7 is a top view of a rotor holder according to a preferred embodiment of the present invention.

Next, a fixing structure for fixing the rotor holder 32 and the turntable 34 to each other will now be described below. FIG. 5 is a partial vertical cross-sectional view of the rotating portion 3. FIG. 6 is a bottom view of the turntable 34. FIG. 7 is a top view of the rotor holder 32. Sections of the turntable 34 and the rotor holder 32 illustrated in FIG. 4 are taken along line IV-IV in FIGS. 6 and 7, respectively.

The upper cover portion 32b of the rotor holder 32 includes a plurality of fixing holes 53 defined therein. Each of the fixing holes 53 is arranged to extend in the axial direction through the upper cover portion 32b. As illustrated in FIG. 7, in the present preferred embodiment, the fixing holes 53 are arranged at regular intervals in the circumferential direction. This arrangement contributes to limiting a displacement of the center of gravity of the rotor holder 32 owing to the fixing holes 53. Note, however, that the fixing holes 53 may not necessarily be arranged either in the circumferential direction or at regular intervals. Also note that the number of fixing holes 53 is not limited to the number illustrated in FIG. 7.

Meanwhile, a plurality of fixing projections 54 are arranged on a lower surface of the turntable 34. As illustrated in FIG. 5, each of the fixing projections 54 is arranged to extend through a corresponding one of the fixing holes 53 of the rotor holder 32 beyond a lower surface of the upper cover portion 32b. Each fixing projection 54 includes a beam portion 54a, a pillar portion 54b, and an engaging portion 54c. The beam portion 54a is arranged to extend in a direction perpendicular to the pillar portion 54b between the base end portion 54d and an upper end portion of the pillar portion 54b. The pillar portion 54b is arranged to extend downward from an end portion of the beam portion 54a. The engaging portion 54c is a portion arranged to project radially inward from a lower end portion of the pillar portion 54b.

The fixing projections 54 according to the present preferred embodiment are molded together with other portions of the turntable 34 when the turntable 34 is molded by an injection molding process. Therefore, a through hole 55 which opens into a space above the upper surface of the turntable 34 is defined above the engaging portion 54c of each fixing projection 54. An insert mold that defines a portion of a mold used to mold the upper surface of the turntable 34 is arranged within the through hole 55 in the injection molding process. An upper surface of the engaging portion 54c is molded by the insert mold.

Each of the fixing projections 54 is arranged at a position corresponding to that of a separate one of the fixing holes 53. Therefore, as illustrated in FIG. 6, the fixing projections 54 are arranged at regular intervals in the circumferential direction. This arrangement contributes to limiting a displacement of the center of gravity of the turntable 34 owing to the fixing projections 54. Note, however, that the fixing projections 54 may not necessarily be arranged either in the circumferential direction or at regular intervals. Also note that the number of fixing projections 54 is not limited to the number illustrated in FIG. 6.

Figure 8:
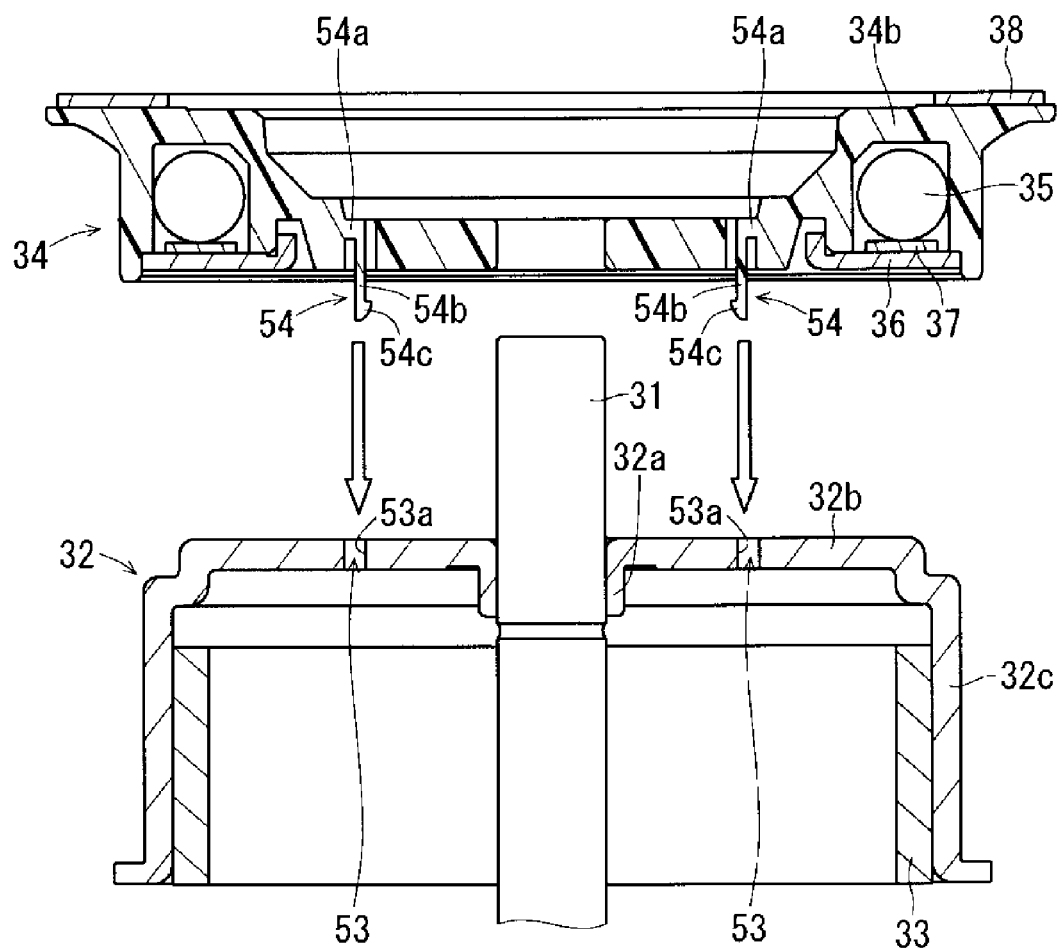
FIG. 8 is a diagram illustrating how the rotor holder and the turntable are fixed to each other according to a preferred embodiment of the present invention.

FIG. 8 is a diagram illustrating how the turntable 34 is fixed to the rotor holder 32. Referring to FIG. 8, when the turntable 34 is fixed to the rotor holder 32, the turntable 34 is brought closer to the rotor holder 32 from above such that the fixing projections 54 are inserted into the fixing holes 53, respectively.

At this time, the engaging portion 54c of each fixing projection 54 is brought into contact with a cylindrical surface 53a defining a corresponding one of the fixing holes 53 of the rotor holder 32, so that the pillar portion 54b of the fixing projection 54 is bent radially outward while the fixing projection 54 is being inserted through the fixing hole 53. Once the entire engaging portion 54c is moved beyond the lower surface of the upper cover portion 32b, the pillar portion 54b regains its original shape. As a result, as illustrated in FIG. 5, the upper surface of the engaging portion 54c is brought into contact with the lower surface of the upper cover portion 32b, so that the engaging portion 54c is brought into engagement with the upper cover portion 32b.

In the state illustrated in FIG. 5, the beam portion 54a and the base end portion 54d of each fixing projection 54 are located above an upper end portion of a corresponding one of the fixing holes 53 with an intervening gap. Therefore, the pillar portion 54b of the fixing projection 54 can be considered to include a lower pillar portion 54e located within the fixing hole 53, and an upper pillar portion 54f located above the upper end portion of the fixing hole 53. The upper pillar portion 54f is arranged to be out of contact with the rotor holder 32 even after the turntable 34 is fixed to the rotor holder 32. This arrangement allows the upper pillar portion 54f to be elastically deformed radially and circumferentially.

Figure 9:
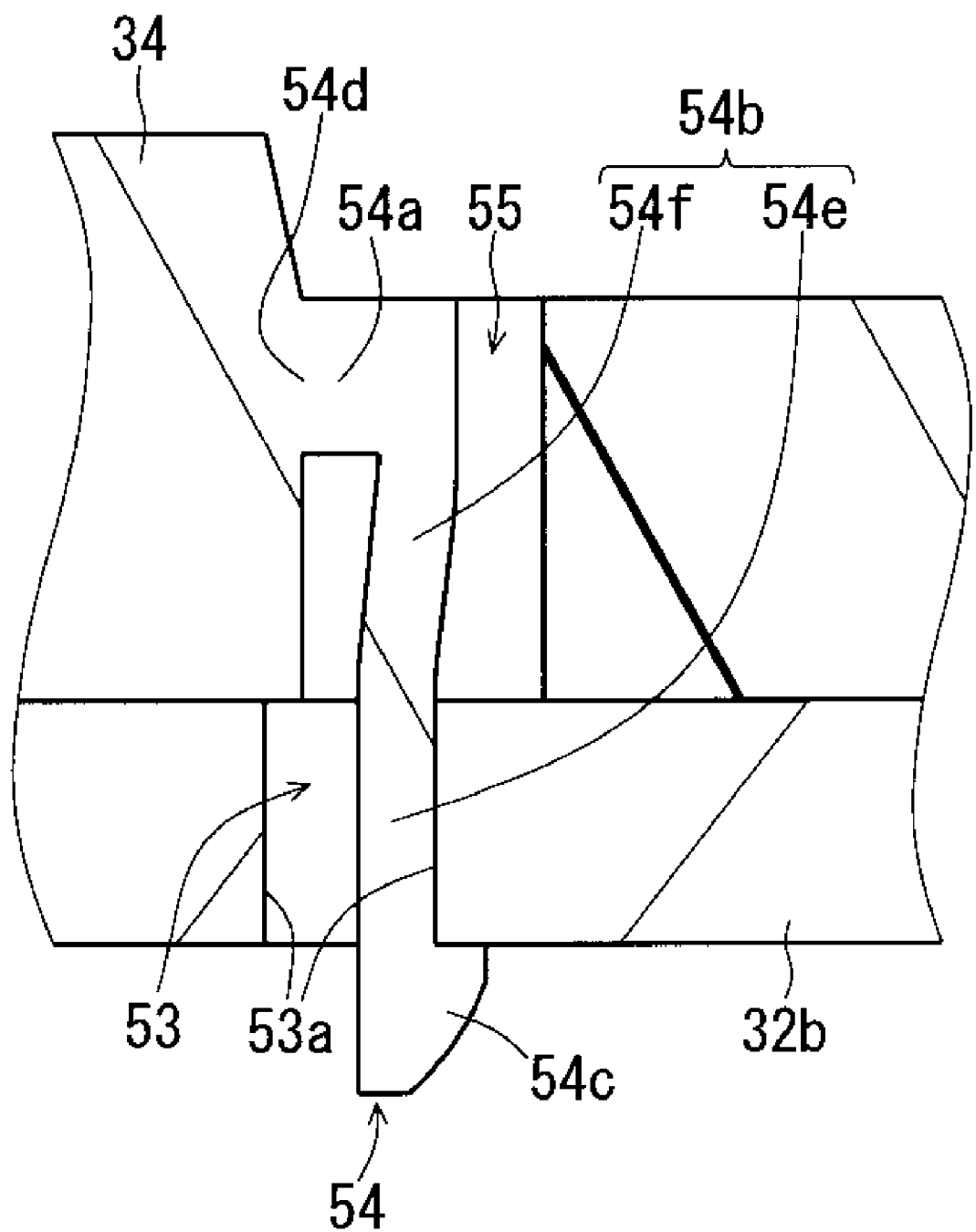
FIG. 9 is a partial vertical cross-sectional view of the rotor holder and the turntable according to a preferred embodiment of the present invention.

FIG. 9 is a partial vertical cross-sectional view of one of the fixing projections 54 and its vicinity in the case where the fixing projection 54 is radially displaced from a corresponding one of the fixing holes 53 due to a dimensional error of the rotor holder 32 or the turntable 34. Even in this case, the upper pillar portion 54f of the fixing projection 54 of the brushless motor 13 is elastically deformable in the radial direction. An elastic deformation of the upper pillar portion 54f absorbs the dimensional error of the rotor holder 32 or the turntable 34. This enables the fixing projection 54 to be inserted through the corresponding fixing hole 53 to achieve engagement of the engaging portion 54c.

In FIG. 9, a radially inner surface of the lower pillar portion 54e of the fixing projection 54 is arranged to be in contact with the cylindrical surface 53a defining the fixing hole 53 of the rotor holder 32. This contact causes a force to act between the lower pillar portion 54e and the cylindrical surface 53a. This causes the elastic deformation of the upper pillar portion 54f. Even only a slight contact between the lower pillar portion 54e and the cylindrical surface 53a can cause a force to act therebetween to cause an elastic deformation of the upper pillar portion 54f.

According to the present preferred embodiment, of all the portions of the turntable 34, only the upper pillar portion 54f of the fixing projection 54 undergoes a substantially local elastic deformation. Thus, the other portions of the turntable 34 do not undergo a significant deformation. This enables the rotor holder 32 and the turntable 34 to be fixed to each other while maintaining the coaxiality of each of the rotor holder 32 and the turntable 34 with respect to the shaft 31.

Moreover, the lower pillar portion 54e and the upper pillar portion 54f of each of the fixing projections 54 according to the present preferred embodiment are arranged to have substantially the same radial dimension. In other words, the pillar portion 54b of each fixing projection 54 does not increase in radial dimension above the upper end portion of the corresponding fixing hole 53. This enables the upper pillar portion 54f of the fixing projection 54 to undergo a more favorable elastic deformation.

Furthermore, referring to FIG. 5, in the present preferred embodiment, the radially inner surface of the lower pillar portion 54e of each fixing projection 54 is arranged to be in contact with the cylindrical surface 53a defining the corresponding fixing hole 53 of the rotor holder 32, while a radially outer surface of the lower pillar portion 54e is arranged radially opposite the cylindrical surface 53a of the rotor holder 32 with an intervening gap. This gap enables the fixing projection 54 to be smoothly inserted through the fixing hole 53 with the fixing projection 54 bent radially outward.

Note that the engaging portion 54c may be arranged to project radially outward from the lower end portion of the pillar portion 54b. In this case, the radially outer surface of the lower pillar portion 54e may be arranged to be in contact with the cylindrical surface 53a of the rotor holder 32 with an intervening gap arranged between the radially inner surface of the lower pillar portion 54e and the cylindrical surface 53a.

Furthermore, in the present preferred embodiment, the upper pillar portion 54f of each fixing projection 54 is arranged to be elastically deformable in the circumferential direction as well. Accordingly, even if any fixing projection 54 is circumferentially displaced from the corresponding fixing hole 53, the upper pillar portion 54f of the fixing projection 54 is capable of being elastically deformed in the circumferential direction. Therefore, even in that case, it is possible to insert the fixing projection 54 through the fixing hole 53.

Both circumferential end surfaces of each fixing projection 54 may be either arranged to be in contact with the corresponding cylindrical surface 53 of the rotor holder 32, or arranged circumferentially opposite the cylindrical surface 53 with intervening gaps. Alternatively, only one of the circumferential end surfaces of each fixing projection 54 may be arranged to be in contact with the corresponding cylindrical surface 53a of the rotor holder 32, with the other circumferential end surface of the fixing projection 54 arranged circumferentially opposite the cylindrical surface 53a of the rotor holder 32 with an intervening gap. The intervening gap(s) enables the fixing projection 54 to be smoothly inserted through the corresponding fixing hole 53 with the fixing projection 54 bent in the circumferential direction.

Furthermore, referring to FIG. 5, in the present preferred embodiment, an upper surface of the beam portion 54a of each fixing projection 54 defines a portion of the upper surface of the turntable 34. In addition, the beam portion 54a is arranged to be elastically deformable in the axial direction with the base end portion 54d as a base point. When the beam portion 54a is pressed downward, the pillar portion 54b and the engaging portion 54c are shifted downward as a result of a bend of the beam portion 54a.

Figure 10:
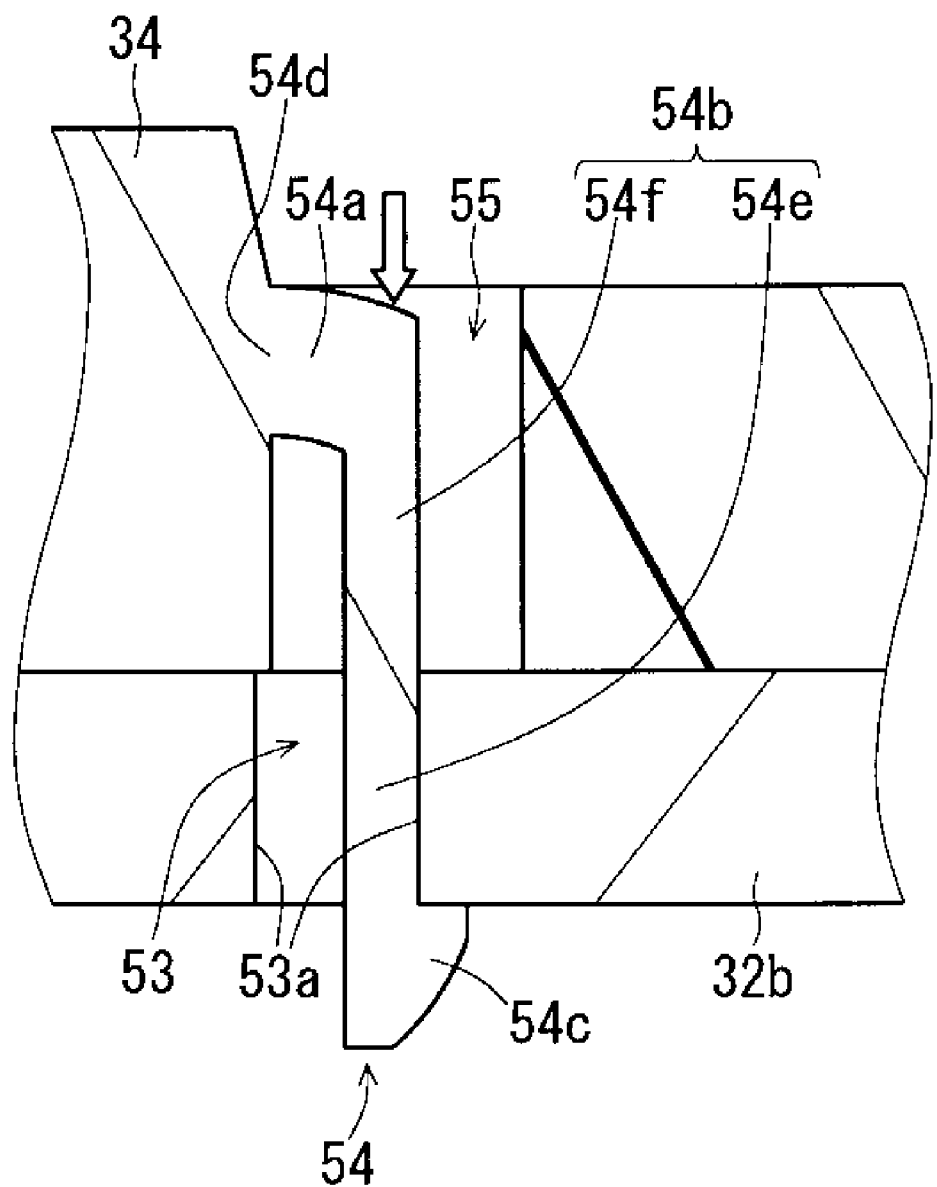
FIG. 10 is a partial vertical cross-sectional view of the rotor holder and the turntable according to a preferred embodiment of the present invention.

FIG. 10 is a partial vertical cross-sectional view of one of the fixing projections 54 and its vicinity in the case where the fixing projection 54 has a slightly decreased axial dimension due to a dimensional error that has occurred in the injection molding process for the turntable 34. Even in this case, regarding the brushless motor 13, it is easy to bring the engaging portion 54c of the fixing projection 54 into engagement with the lower surface of the upper cover portion 32b by pressing the beam portion 54a thereof downward so that the beam portion 54a undergoes an elastic deformation. Moreover, when the engaging portion 54c is engaged with the lower surface of the upper cover portion 32b with the beam portion 54a elastically deformed, the turntable 34 can be fixed to the rotor holder 32 more securely. Design dimensions of each fixing projection 54 may be purposely reduced to improve the strength with which the rotor holder 32 and the turntable 34 are fixed to each other.

Furthermore, referring to FIG. 4, each fixing projection 54 according to the present preferred embodiment is arranged radially inward of the preload spring 42. Therefore, the rigidity of the turntable 34 is not significantly reduced in a region where the turntable 34 is in contact with the lower end portion of the preload spring 42 or in a region where the turntable 34 supports the disk 90.

Figure 11:
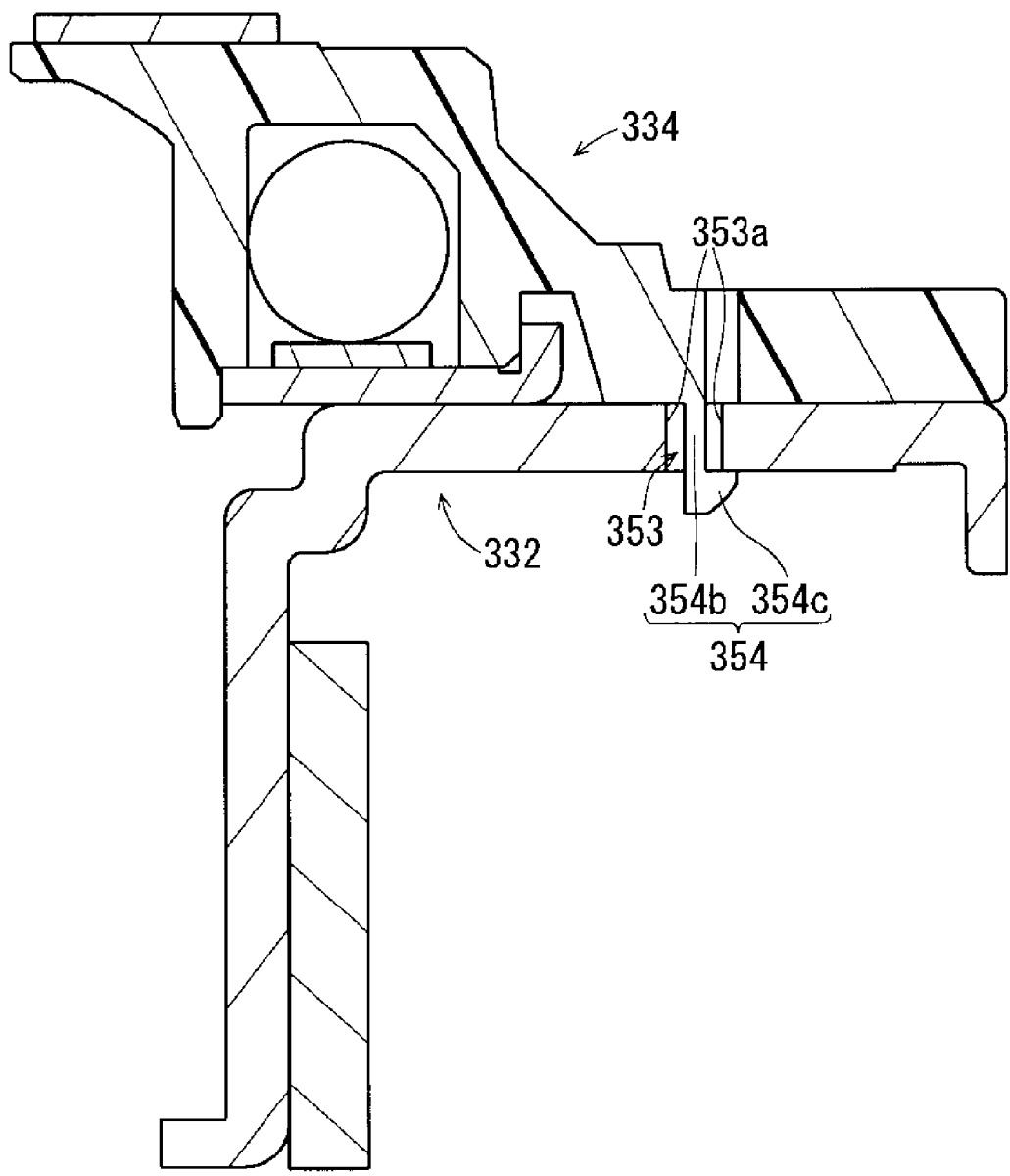
FIG. 11 is a partial vertical cross-sectional view of a rotating portion according to a preferred embodiment of the present invention.

2-4. Fixing Structure II for Fixing Rotor Holder and Turntable to Each Other FIG. 11 illustrates a fixing structure for fixing a rotor holder 332 and a turntable 334 to each other according to another preferred embodiment of the present invention. The fixing structure illustrated in FIG. 11 will now be described below with a focus on differences from the above-described fixing structure.

In the preferred embodiment illustrated in FIG. 11, a plurality of fixing projections 354 are arranged on a lower surface of the turntable 334. Each of the fixing projections 354 includes a pillar portion 354b and an engaging portion 354c. The pillar portion 354b is arranged to extend downward from the lower surface of the turntable 334. The engaging portion 354c is a portion arranged to project radially inward from a lower end portion of the pillar portion 354b.

As illustrated in FIG. 11, a radially inner surface and a radially outer surface of the pillar portion 354b are arranged radially opposite a cylindrical surface 353a defining a corresponding one of fixing holes 353 of the rotor holder 332 with intervening gaps. That is, each of the radially inner surface and the radially outer surface of the pillar portion 354b is arranged to be out of contact with the rotor holder 332 within the fixing hole 353.

Therefore, even if dimensional errors of the rotor holder 332 and the turntable 334 cause a radial displacement between the fixing hole 353 and the fixing projection 354, the pillar portion 354b of the fixing projection 354 is arranged to be out of contact with the rotor holder 332 as long as the degree of the radial displacement falls within the range of each of the gaps arranged radially inside and outside the pillar portion 354b. This enables the fixing projection 354 to be inserted through the fixing hole 353 without an elastic deformation of the pillar portion 354b. This enables the rotor holder 332 and the turntable 334 to be fixed to each other while maintaining the coaxiality of each of the rotor holder 332 and the turntable 334 with respect to the shaft.

Adoption of this fixing structure, in particular, eliminates a need to extend the pillar portion 354b upward up to a level higher than that of an upper end portion of the fixing hole 353. This contributes to improving the rigidity of the turntable 334 in a region in the vicinity of a base end portion of the fixing projection 354.

3. Example Modifications

While preferred embodiments of the present invention have been described above, the present invention is not limited to the above-described preferred embodiments. A variety of example modifications of the above-described preferred embodiments will now be described below with a focus on differences from the above-described preferred embodiments.

Figure 12:
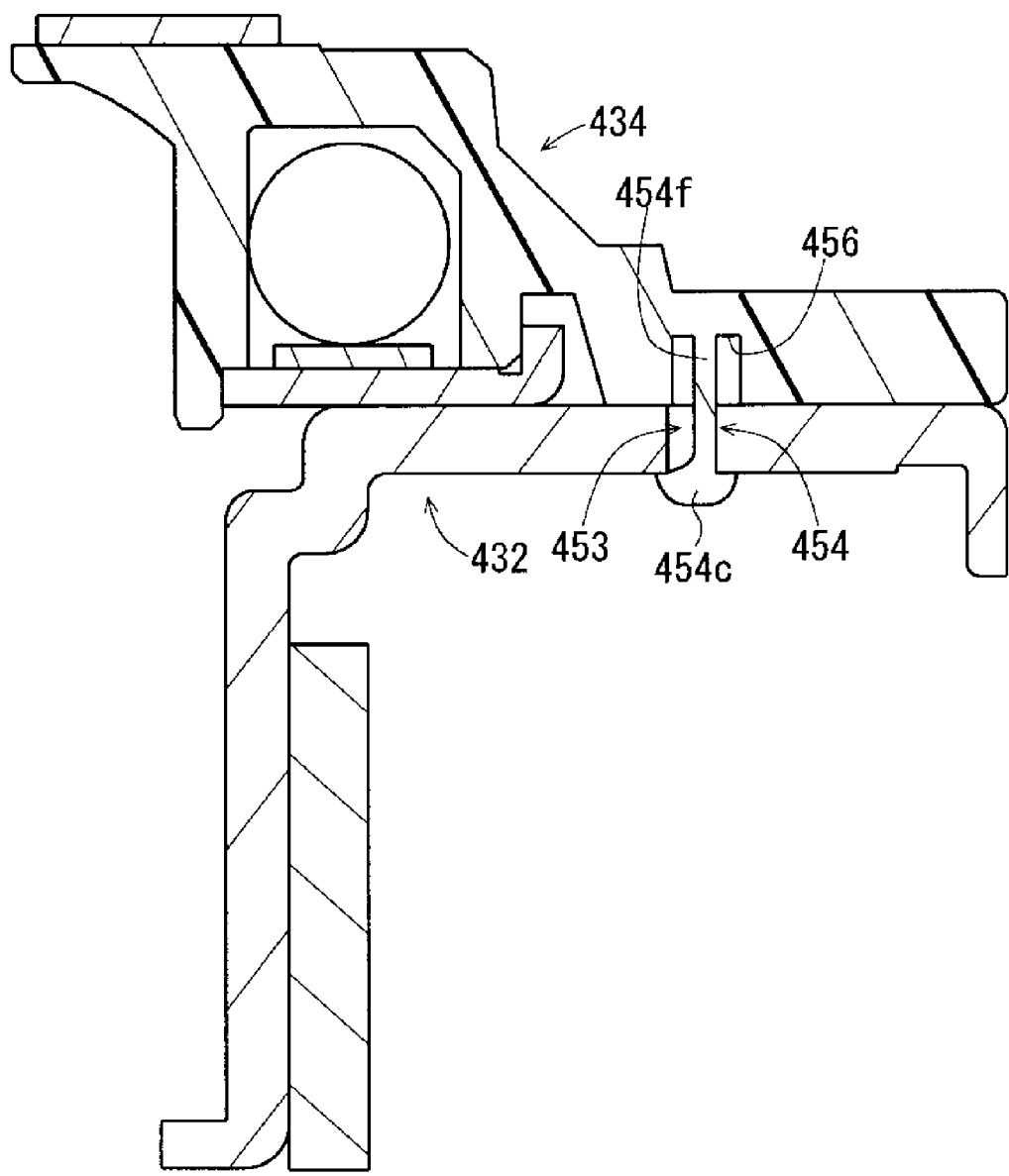
FIG. 12 is a partial vertical cross-sectional view of a rotating portion according to a preferred embodiment of the present invention.
Figure 13:
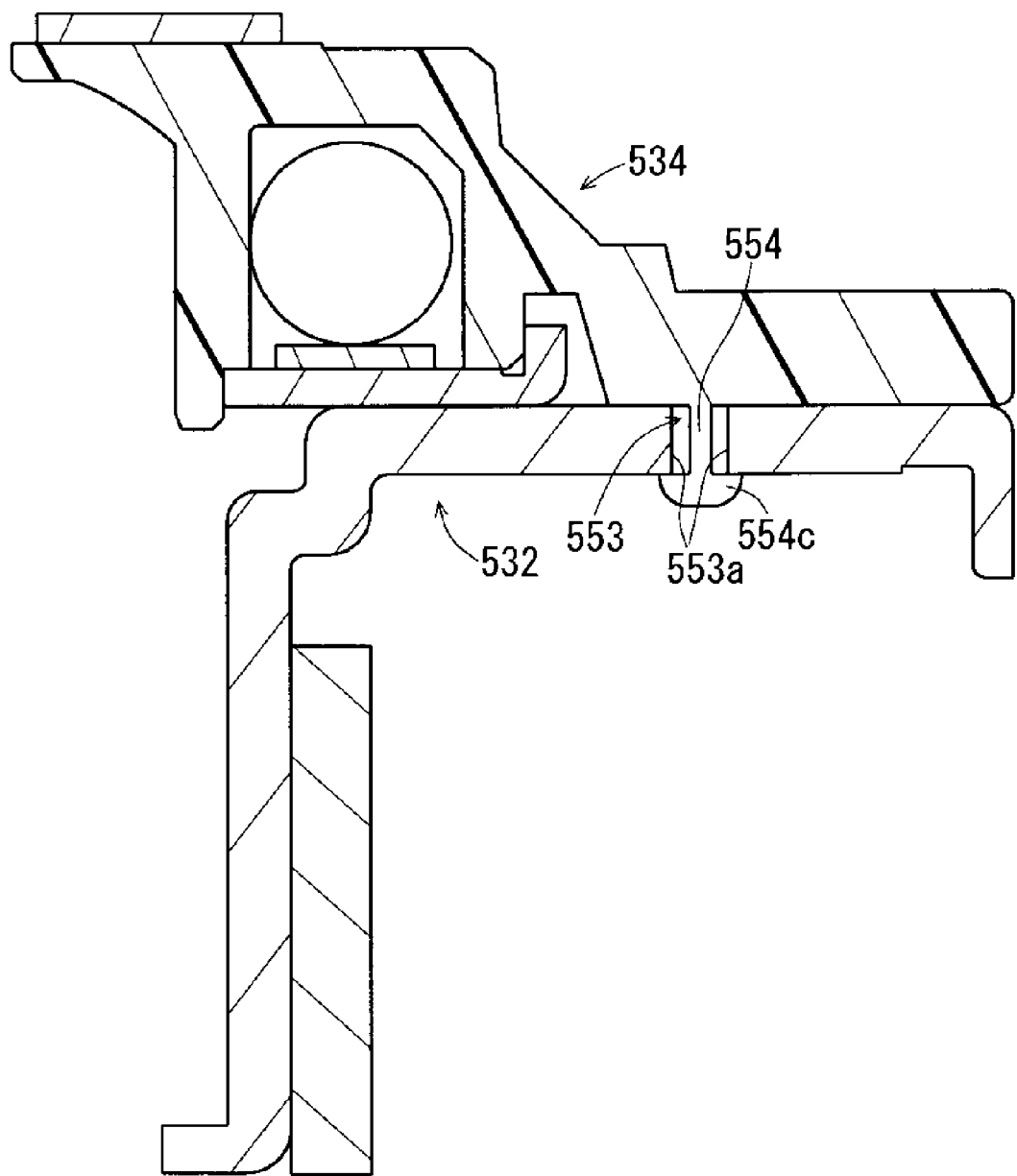
FIG. 13 is a partial vertical cross-sectional view of a rotating portion according to a preferred embodiment of the present invention.

For example, the lower end portion of each fixing projection may be welded to the lower surface of the rotor holder as illustrated in FIGS. 12 and 13.

In an example modification illustrated in FIG. 12, a recessed portion 456 is defined in a lower surface of a turntable 434. In addition, a fixing projection 454 is arranged to extend downward from a surface defining the recessed portion 456. The fixing projection 454 includes a weld portion 454c defined in a lower end portion thereof. The weld portion 454c is welded to a lower surface of a rotor holder 432 after being heated and melt. The fixing projection 454 further includes an upper pillar portion 454f arranged at a level higher than that of an upper end portion of a fixing hole 453. The upper pillar portion 454f is arranged to be out of contact with the rotor holder 432. This arrangement allows the upper pillar portion 454f to be elastically deformed radially and circumferentially.

In an example modification illustrated in FIG. 13, a fixing projection 554 is arranged to extend downward from a lower surface of a turntable 534. The fixing projection 554 includes a weld portion 554c defined in a lower end portion thereof. The weld portion 554c is welded to a lower surface of a rotor holder 532 after being heated and melt. In addition, each of a radially inner surface and a radially outer surface of the fixing projection 554 is arranged radially opposite a cylindrical surface 553a defining a fixing hole 553 of the rotor holder 532 with an intervening gap. This enables the fixing projection 554 to be inserted through the fixing hole 553 even when the fixing hole 553 and the fixing projection 554 are radially displaced from each other.

Note that the weld portion 454c or 554c may be welded to the lower surface of the rotor holder 432 or 532 through either application of heat or application of ultrasonic waves.

In the case where the lower end portion of the fixing projection is welded to the lower surface of the rotor holder as in each of the example modifications illustrated in FIGS. 12 and 13, there is not a need to define an engaging portion in the lower end portion of the fixing projection. Moreover, it is made possible to fix the turntable to the rotor holder without a precise axial thickness of an upper cover portion of the rotor holder or a precise axial length of the fixing projection. This facilitates manufacture of each of the rotor holder and the turntable. Note, however, that use of the engaging portion as in the above-described preferred embodiments facilitates the operation of fixing the rotor holder and the turntable to each other.

Figure 14:
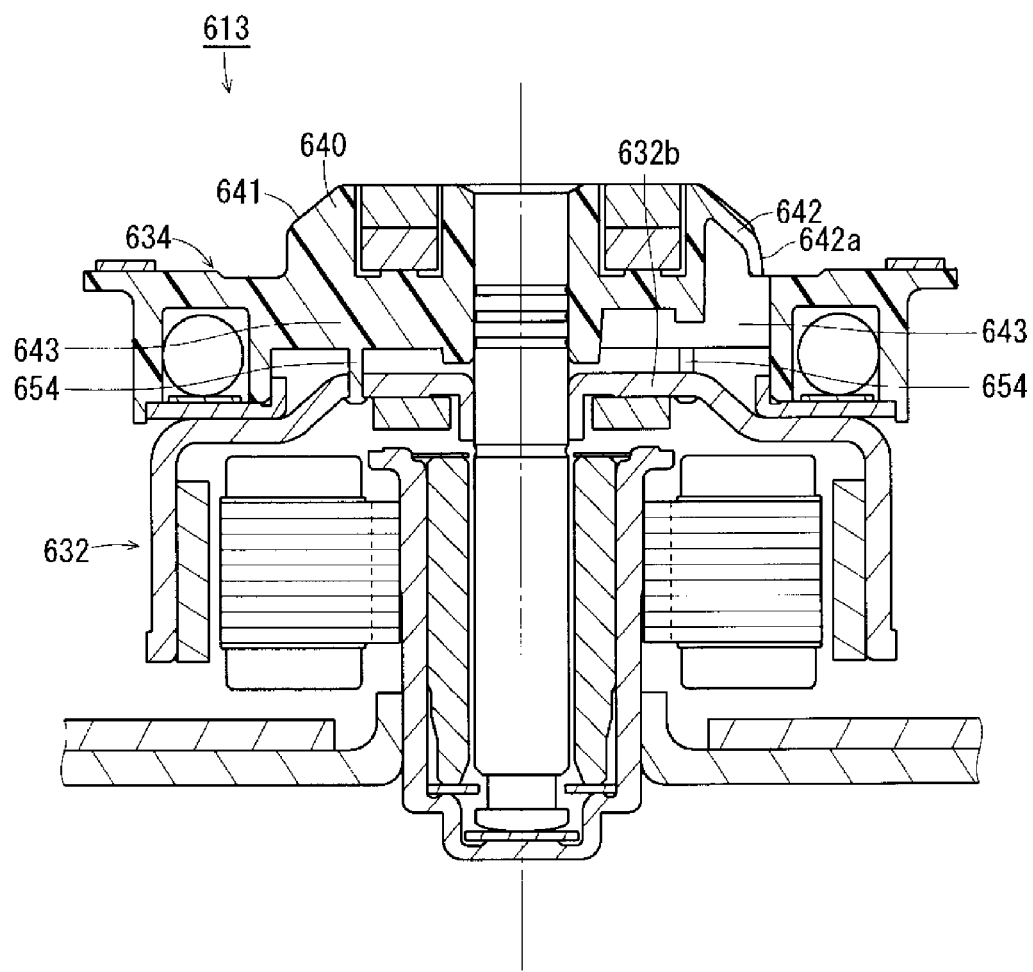
FIG. 14 is a vertical cross-sectional view of a brushless motor according to a preferred embodiment of the present invention.

FIG. 14 is a vertical cross-sectional view of a brushless motor 613 of a different type according to a preferred embodiment of the present invention. The brushless motor 613 illustrated in FIG. 14 includes a center adjustment portion 640 in place of the cone and the preload spring. The center adjustment portion 640 is molded integrally with a turntable 634 by an injection molding process. In other words, the turntable 634 includes the center adjustment portion 640 as an integral portion thereof.

The center adjustment portion 640 includes a plurality of guide surfaces 641 and a plurality of center adjustment claws 642. Each of the guide surfaces 641 is arranged to guide the inner circumferential portion of the disk when the disk is mounted. Each of the center adjustment claws 642 is arranged to support the inner circumferential portion of the mounted disk. The guide surface 641 is arranged to be inclined so as to extend radially outward with decreasing height. The center adjustment claws 642 and the guide surfaces 641 are arranged alternately in the circumferential direction. The outer circumferential surface 642a is arranged radially outward of the guide surface 641. Moreover, each center adjustment claw 642 is arranged to be elastically deformable radially inward while supporting the inner circumferential portion of the disk.

Figure 15:
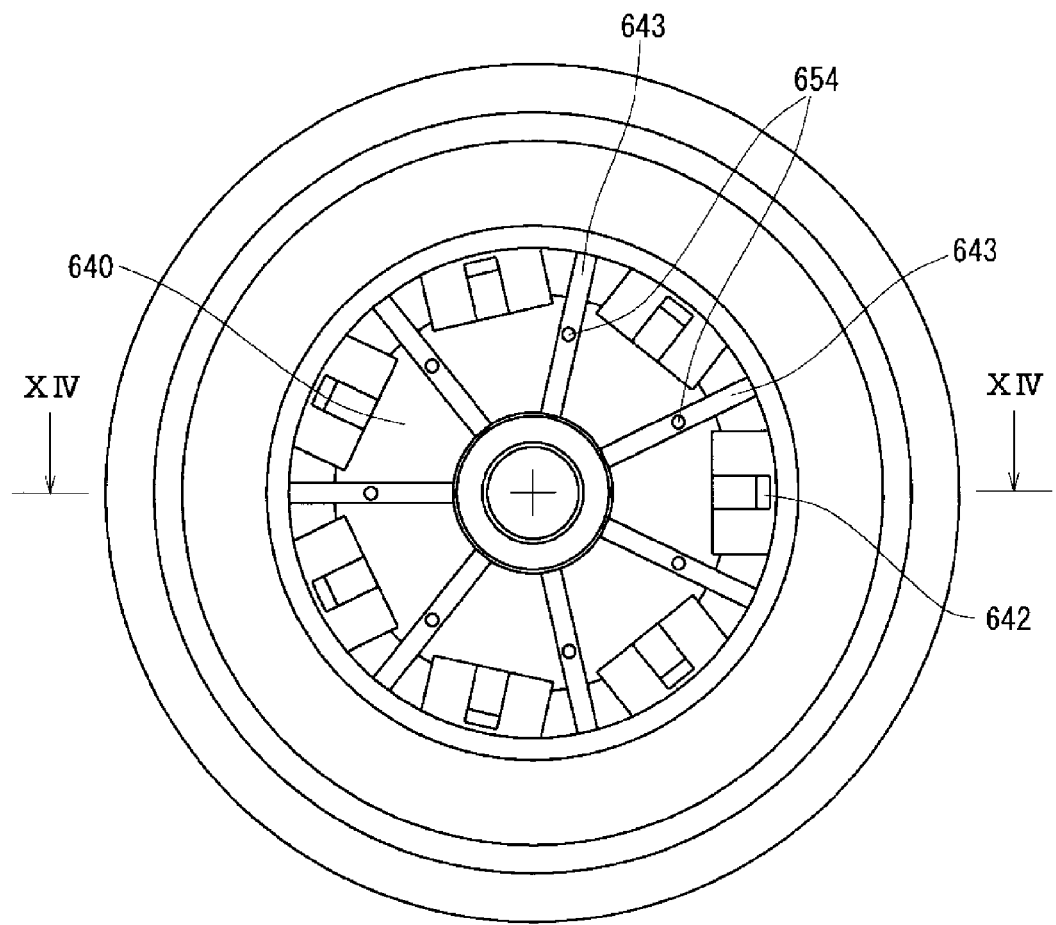
FIG. 15 is a bottom view of a turntable according to a preferred embodiment of the present invention.

FIG. 15 is a bottom view of a resin member including the turntable 634 and the center adjustment portion 640. A section of the turntable 634 illustrated in FIG. 14 is taken along line XIV-XIV in FIG. 15. As illustrated in FIG. 15, a plurality of ribs 643 are defined in a lower surface of the center adjustment portion 640. The ribs 643 are arranged to extend radially. A fixing projection 654 is arranged to extend downward from a lower surface of each rib 643.

Referring to FIG. 14, the lower surface of each rib 643 is arranged to be out of contact with an upper surface of an upper cover portion 632b of a rotor holder 632. Therefore, each fixing projection 654 is arranged to be elastically deformable radially and circumferentially above an upper end portion of a corresponding one of fixing holes 653.

Motors according to preferred embodiments of the present invention may be motors used to rotate optical disks like the motors according to the above-described preferred embodiments and the example modifications thereof, or may be motors used to rotate other types of recording disks such as magnetic disks.

Note that features of the above-described preferred embodiments and the example modifications thereof may be combined as appropriate as long as no conflict arises.

What is claimed is:

1. A motor of a disk drive apparatus comprising:
a stationary portion; and
a rotating portion supported to be rotatable with respect to the stationary portion; wherein the rotating portion includes:
  a shaft arranged to extend along a central axis extending in a vertical direction;
  a rotor holder including an upper cover portion arranged to spread radially away from the central axis, and a cylindrical portion arranged to extend downward from a radially outer end portion of the upper cover portion;
  a rotor magnet fixed to an inner circumferential surface of the cylindrical portion of the rotor holder; and
  a turntable arranged above the rotor holder to support a disk directly or indirectly;
the stationary portion includes:
  a bearing portion arranged to rotatably support the shaft; and
  an armature arranged radially opposite the rotor magnet;
the rotor holder includes a first through hole defined in a center thereof, and an inner circumferential surface defining the first through hole and arranged to be in contact with an outer circumferential surface of the shaft;
the turntable includes a second through hole defined in a center thereof, and an inner circumferential surface defining the second through hole and arranged to be in contact with the outer circumferential surface of the shaft;
the upper cover portion includes a plurality of fixing holes arranged to extend in the vertical direction therethrough;
the turntable includes a plurality of fixing projections arranged to extend through the fixing holes beyond a lower surface of the upper cover portion to be in contact with the lower surface of the upper cover portion; and
each of the fixing projections includes a base end portion arranged at a level higher than that of an upper end portion of a corresponding one of the fixing holes, and the fixing projection is arranged to be elastically deformable in a radial direction above the upper end portion of the corresponding fixing hole.

2. The motor according to claim 1, wherein each fixing projection includes a portion arranged within the corresponding fixing hole, and a portion arranged above the upper end portion of the corresponding fixing hole, both the portions being substantially equal in a radial dimension.

3. The motor according to claim 1, wherein one of radially inner and outer surfaces of each fixing projection is arranged to be in contact with a surface of the rotor holder which defines the corresponding fixing hole, while the other of the radially inner and outer surfaces of the fixing projection is arranged radially opposite the surface of the rotor holder which defines the corresponding fixing hole with an intervening gap.

4. The motor according to claim 1, wherein each fixing projection is arranged to be elastically deformable also in a circumferential direction above the upper end portion of the corresponding fixing hole.

5. The motor according to claim 4, wherein a circumferential end surface of each fixing projection is arranged to be in contact with a surface of the rotor holder which defines the corresponding fixing hole, while an opposite circumferential end surface of the fixing projection is arranged circumferentially opposite the surface of the rotor holder which defines the corresponding fixing hole with an intervening gap.

6. The motor according to claim 1, wherein each fixing projection includes an engaging portion arranged to be engaged with the lower surface of the upper cover portion.

7. The motor according to claim 1, wherein a lower end portion of each fixing projection is welded to the lower surface of the upper cover portion.

8. The motor according to claim 1, wherein
each fixing projection includes:
  a pillar portion arranged to extend in an axial direction; and
  a beam portion arranged to extend in a direction perpendicular to the pillar portion between the base end portion and an upper end portion of the pillar portion; and
the beam portion is arranged to be elastically deformable in the axial direction.

9. The motor according to claim 1, further comprising a center adjustment member including a support surface arranged to support an inner circumferential portion of the disk, and arranged to be movable in an axial direction along the shaft.

10. The motor according to claim 1, wherein the turntable includes:

a plurality of guide surfaces each arranged to be inclined so as to extend radially outward with decreasing height, and arranged to guide an inner circumferential portion of the disk; and a plurality of center adjustment claws arranged alternately with the guide surfaces in a circumferential direction, each center adjustment claw including an outer circumferential surface arranged radially outward of the guide surface, each center adjustment claw being arranged to be deformable radially inward, and arranged to support the inner circumferential portion of the disk.

11. A disk drive apparatus comprising:

the motor of claim 1;

an access portion arranged to perform at least one of reading and writing of information from or to the disk held by the rotating portion of the motor; and a housing arranged to contain the motor and the access portion.

12. A motor of a disk drive apparatus comprising:

a stationary portion; and a rotating portion supported to be rotatable with respect to the stationary portion; wherein the rotating portion includes:
 a shaft arranged to extend along a central axis extending in a vertical direction;
 a rotor holder including an upper cover portion arranged to spread radially away from the central axis, and a cylindrical portion arranged to extend downward from a radially outer end portion of the upper cover portion;
 a rotor magnet fixed to an inner circumferential surface of the cylindrical portion of the rotor holder; and
 a turntable arranged above the rotor holder to support a disk directly or indirectly;

the stationary portion includes:
 a bearing portion arranged to rotatably support the shaft; and
 an armature arranged radially opposite the rotor magnet;

the rotor holder includes a first through hole defined in a center thereof, and an inner circumferential surface defining the first through hole and arranged to be in contact with an outer circumferential surface of the shaft;

the turntable includes a second through hole defined in a center thereof, and an inner circumferential surface defining the second through hole and arranged to be in contact with the outer circumferential surface of the shaft;

the upper cover portion includes a plurality of fixing holes arranged to extend in the vertical direction therethrough;

the turntable includes a plurality of fixing projections arranged to extend through the fixing holes beyond a lower surface of the upper cover portion to be in contact with the lower surface of the upper cover portion; and radially inner and outer surfaces of each fixing projection are arranged radially opposite a surface of the rotor holder which defines a corresponding one of the fixing holes with intervening gaps.

13. The motor according to claim 12, wherein each fixing projection includes an engaging portion arranged to be engaged with the lower surface of the upper cover portion.

14. The motor according to claim 12, wherein a lower end portion of each fixing projection is welded to the lower surface of the upper cover portion.

15. The motor according to claim 12, wherein
each fixing projection includes:
 a pillar portion arranged to extend in an axial direction; and
 a beam portion arranged to extend in a direction perpendicular to the pillar portion between the base end portion and an upper end portion of the pillar portion; and
the beam portion is arranged to be elastically deformable in the axial direction.

16. The motor according to claim 12, further comprising a center adjustment member including a support surface arranged to support an inner circumferential portion of the disk, and arranged to be movable in an axial direction along the shaft.

17. The motor according to claim 16, further comprising a preload spring arranged to apply an upward pressure to the center adjustment member, wherein each fixing projection is arranged radially inward of the preload spring.

* * * * *